(12) United States Patent
Li et al.

(10) Patent No.: US 7,817,638 B2
(45) Date of Patent: Oct. 19, 2010

(54) METHOD FOR PROMPTLY REDIALING A BROADBAND ACCESS SERVER

(75) Inventors: You-Xiang Li, Shenzhen (CN); Xiao-Ni Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 80 days.

(21) Appl. No.: 12/247,241

(22) Filed: Oct. 8, 2008

(65) Prior Publication Data

US 2009/0262738 A1 Oct. 22, 2009

(30) Foreign Application Priority Data

Apr. 17, 2008 (CN) .......................... 2008 1 0301180

(51) Int. Cl.
  *H04L 12/28* (2006.01)
(52) U.S. Cl. .......................... 370/392; 709/223; 709/227
(58) Field of Classification Search ........................ None
  See application file for complete search history.

(56) References Cited

U.S. PATENT DOCUMENTS

| | | | | |
|---|---|---|---|---|
| 6,928,076 B2 * | 8/2005 | Mehta et al. | ................ | 370/392 |
| 7,149,808 B2 * | 12/2006 | Lu | ............................... | 709/230 |
| 2004/0071133 A1 * | 4/2004 | Yusko et al. | ................ | 370/356 |
| 2005/0021760 A1 * | 1/2005 | Kim | ........................... | 709/227 |
| 2007/0067308 A1 * | 3/2007 | Amrhein et al. | ............... | 707/10 |
| 2008/0091814 A1 * | 4/2008 | Xie | ............................. | 709/223 |
| 2009/0013094 A1 * | 1/2009 | Chen et al. | .................... | 710/10 |
| 2009/0262738 A1 * | 10/2009 | Li et al. | ...................... | 370/392 |

* cited by examiner

*Primary Examiner*—Robert W Wilson
(74) *Attorney, Agent, or Firm*—Frank R. Niranjan

(57) ABSTRACT

A method for promptly redialing a broadband access server is disclosed. The method includes: sending a PPPoE Active Discovery Terminate (PADT) packet to a BAS from a client computer upon the condition that the client computer has been abnormally disconnected from the broadband access server (BAS), sending a responsive PADT packet to the client computer if the client computer is allowed to perform the prompt redial. The method further includes: sending a PPPoE Active Discovery Initiation (PADI) packet to the BAS from the client computer, sending a PPPoE Active Discovery Offer (PADO) packet to the client computer, sending a PPPoE Active Discovery Request (PADR) packet to the BAS from the client computer, sending a PPPoE Active Discovery Confirmation (PADS) packet to the client computer from the BAS so as to create a new connection between the client computer and the BAS.

4 Claims, 3 Drawing Sheets

METHOD FOR PROMPTLY REDIALING A BROADBAND ACCESS SERVER

BACKGROUND

1. Field of the Invention

Embodiments of the present disclosure relate to methods for data communication in broadband networks, and particularly to a method for promptly redialing a broadband access server.

2. Description of Related Art

The technical specification of the Point-to-Point Protocol over Ethernet (PPPoE) has been defined by the Internet Engineering Task Force (IETF) in 1998. It employs the Point-to-Point Protocol (PPP) to implement a faster, more reliable and more convenient Asymmetric Digital Subscriber Line (ADSL) broadband access and combines the existing broadband access servers with the local Ethernet. The hardware requirement for a user terminal is considered, thereby enhancing the overall performance of an ADSL broadband access. As a result, the PPPoE specification has received wide support and has been a preferred broadband access mode for broadband access operators.

However, under an authentication mode of the specification of the PPPoE, the user cannot promptly redial into the broadband access server when the connection has been abnormally terminated. When the connection has been abnormally terminated, the user needs to wait several minutes prior to dialing into the broadband access server again. The aforementioned is an inconvenience to users that the operators desire to solve.

What is needed, therefore, is a method for promptly redialing a broadband access server.

SUMMARY

A method for redialing a broadband access server is provided. The method includes: sending a PPPoE Active Discovery Terminate (PADT) packet to a broadband access server (BAS) from a client computer upon the condition that the client computer has been abnormally disconnected from the BAS, wherein the PADT packet comprises identity data of a user of the client computer; determining if the client computer is allowed to perform a redial to the BAS according to the identity data; in response to the client computer is authorized to perform a prompt redial, sending a responsive PADT packet to the client computer to release on-line resources previously allocated for the client computer in order to end the connection between the client computer and the BAS; sending a PPPoE Active Discovery Initiation (PADI) packet to the BAS from the client computer; responding to the PADI packet by sending a PPPoE Active Discovery Offer (PADO) packet to the client computer from the BAS; sending a PPPoE Active Discovery Request (PADR) packet to the BAS from the client computer; responding to the PADR packet by sending a PPPoE Active Discovery Confirmation (PADS) packet to the client computer from the BAS so as to create a new connection between the client computer and the BAS.

Other systems, methods, features, and advantages of the present disclosure will become apparent to one with ordinary skill in the art upon examination of the following drawings and detailed description.

DETAILED DESCRIPTION OF CERTAIN INVENTIVE EMBODIMENTS

Figure 1:
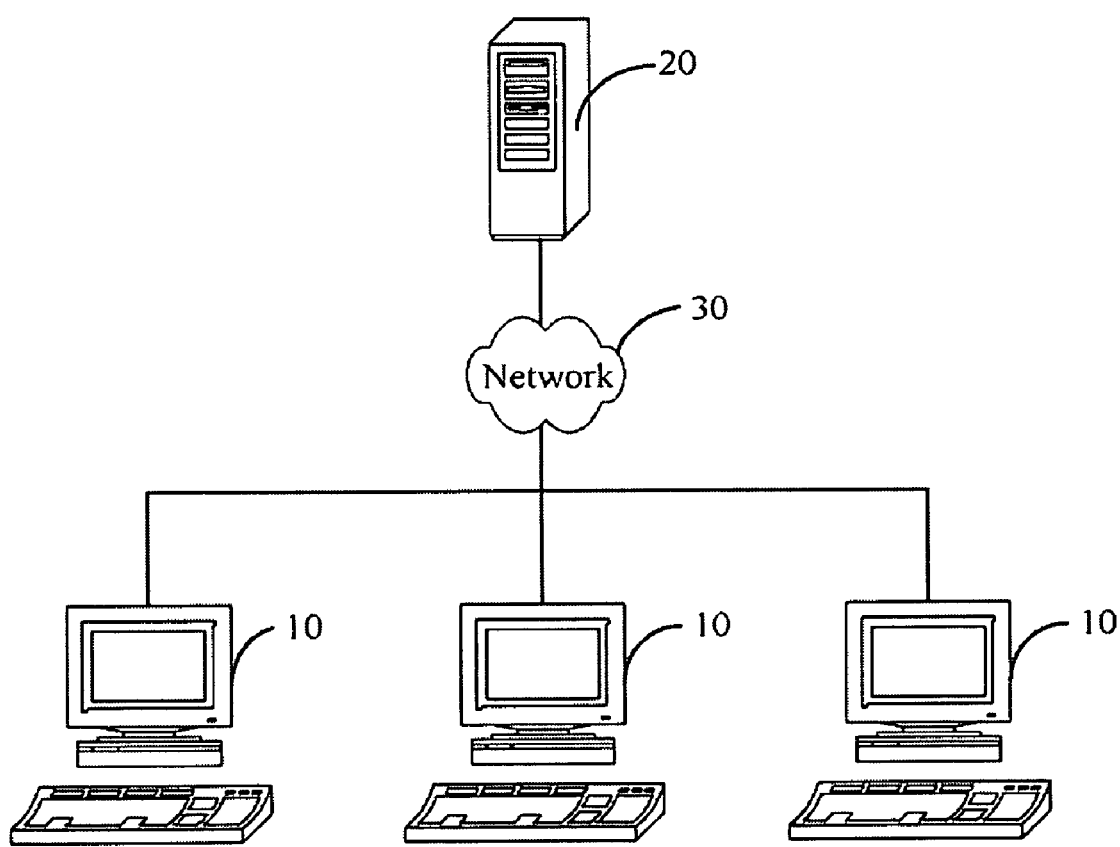
FIG. 1 is a hardware configuration of one embodiment of a method for promptly redialing a broadband access server.

FIG. 1 is a hardware configuration of one embodiment of a method for promptly redialing a broadband access server (BAS) 20. In one embodiment, the hardware configuration includes one or more client computers, such as a client computer 10, along with the BAS 20. Each of the client computers 10 are connected to the BAS 20 through a network 30. In one embodiment, the network 30 may be the Internet, an Intranet, or any other types of networks.

Figure 2:
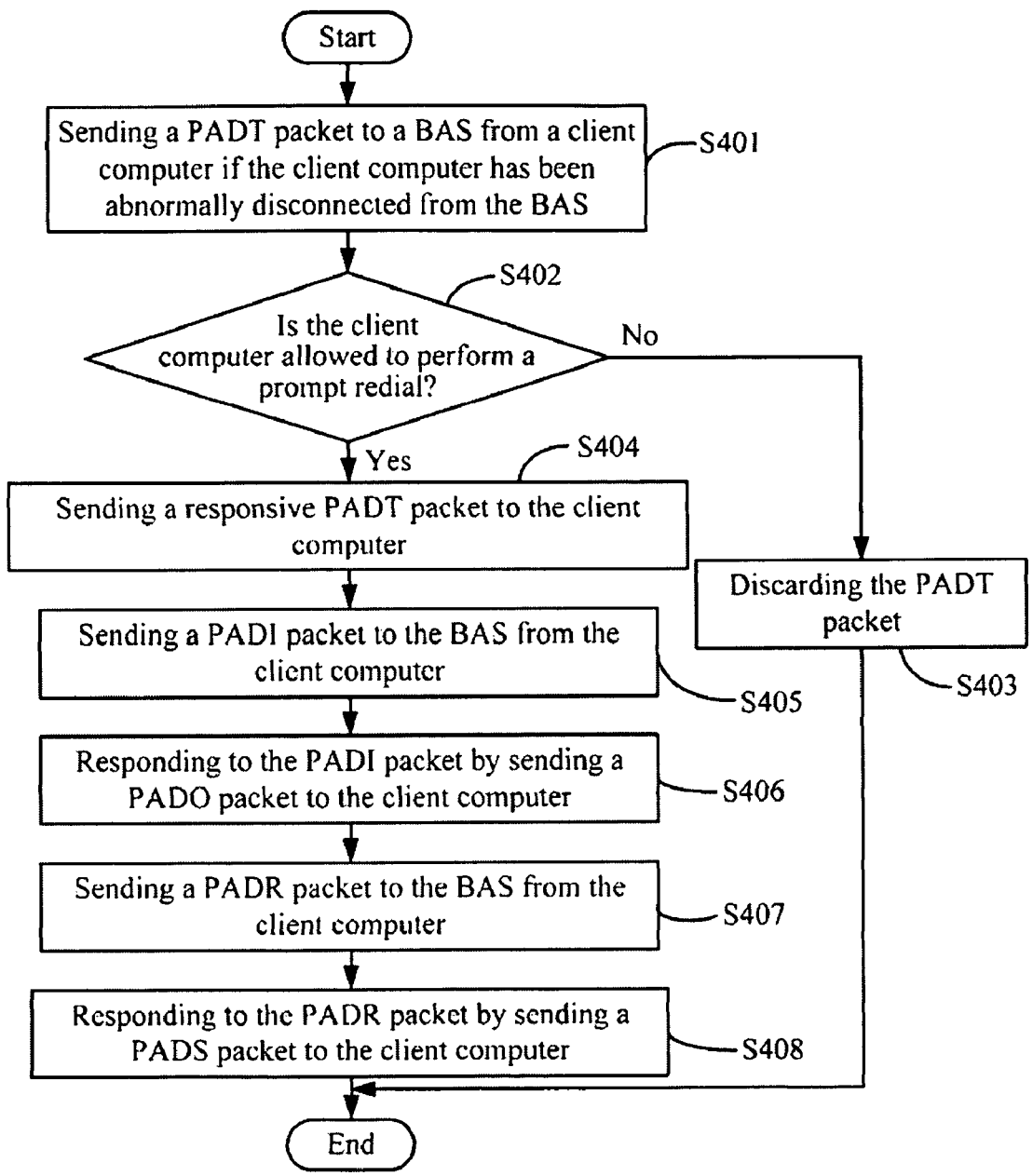
FIG. 2 is a flowchart of one embodiment of a method for promptly redialing a broadband access server.

FIG. 2 is a flowchart of one embodiment of a method for promptly redialing a broadband access server upon the condition that the a client computer becomes abnormally disconnected from the broadband access server. Depending on the embodiment, additional blocks may be added, while others removed, and the ordering of the blocks may also be changed.

Figure 3:
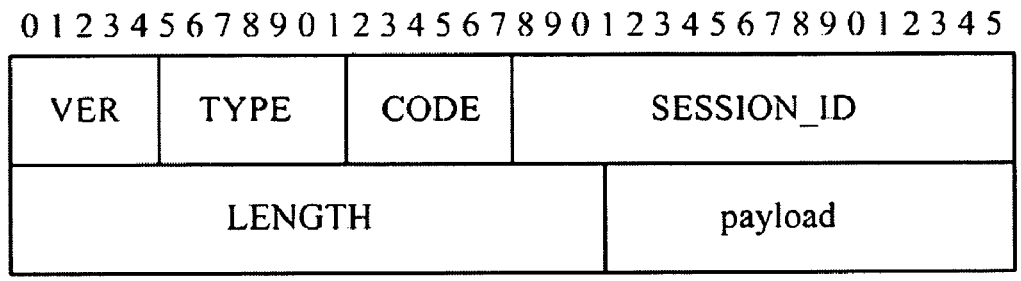
FIG. 3 is a schematic diagram of a format of a PADT packet for PPPoE.

In block S401, the client computer 10 sends a PPPoE Active Discovery Terminate (PADT) packet to the BAS 20, upon the condition that the client computer 10 has been abnormally disconnected from the BAS 20. The PADT packet comprises identity data of a user of the client computer 10, which is stored in a payload field of the PADT packet. In one example, one embodiment of a format of a PADT packet for PPPoE is shown in FIG. 3. Depending on the embodiment, the PADT packet may include a VER field, a TYPE field, a CODE field, a SESSION_ID field, a LENGTH field, and a payload field. The VER field is configured for recording a version number of the PPPoE specification. The TYPE field is configured for recording a type of the PPPoE specification. The CODE field is configured for recording a stage of PPPoE, wherein the stage of the PPPoE may be a discovery stage or a session stage. The SESSION_ID field is configured for recording an identifier of a PPP session. The LENGTH field is configured for recording a length of a PPPoE payload. Depending on the embodiment, the identity data includes information for identifying whether the user is an advanced user or an ordinary user. In other embodiments, the identity data may include other suitable information for identifying an identity of the user.

In block S402, the BAS 20 determines if the client computer 10 is allowed to perform a prompt redial by identifying whether the user is the advanced user or the ordinary user according to the identity data. If the client computer 10 is allowed to perform the prompt redial, the procedure skips to block S404. Otherwise if the client computer 10 is not allowed to perform the prompt redial, the procedure proceeds to block S403. A principle of determining if the client computer 10 is allowed to perform the prompt redial includes the following: determining the client computer 10 is allowed to perform the prompt redial if the user is the advanced user, and determining the client computer 10 is not allowed to perform the prompt redial if the user is the ordinary user.

In block S403, the BAS 20 discards the PADT packet sent from the client computer 10 if the client computer 10 is not allowed to perform the prompt redial, subsequently redialing after a predetermined period of time.

In block S404, if the client computer 10 is allowed to perform the prompt redial, the BAS 20 sends a responsive PADT packet to the client computer 10 to release on-line resources previously allocated for the client computer 10, in order to end the connection between the client computer 10 and the BAS 20.

In block S405, the client computer 10 sends a PPPoE Active Discovery Initiation (PADI) packet to the BAS 20.

In block S406, the BAS 20 responds to the PADI packet by sending a PPPoE Active Discovery Offer (PADO) packet to the client computer 10.

In block S407, the client computer 10 sends a PPPoE Active Discovery Request (PADR) packet to the BAS 20.

In block S408, the BAS 20 responds to the PADR packet by sending a PPPoE Active Discovery Session Confirmation (PADS) packet to the client computer 10 to create a new connection between the client computer 10 and the BAS 20.

It should be emphasized that the above-described embodiments of the present disclosure, particularly, any preferred embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for redialing a broadband access server, the method being performed by execution of computer readable program code by at least one processor of at least one computer system, the method comprising:

sending a Point-to-Point Protocol over Ethernet (PPPoE) Active Discovery Terminate (PADT) packet to a broadband access server (BAS) from a client computer upon the condition that the client computer has been abnormally disconnected from the BAS using the at least one processor, wherein the PADT packet comprises identity data of a user of the client computer;

determining if the client computer is allowed to perform a redial to the BAS according to the identity data using the at least one processor;

in response to the client computer is authorized to perform a prompt redial, sending a responsive PADT packet to the client computer to release on-line resources previously allocated for the client computer in order to end the connection between the client computer and the BAS using the at least one processor;

sending a PPPoE Active Discovery Initiation (PADI) packet to the BAS from the client computer using the at least one processor;

responding to the PADI packet by sending a PPPoE Active Discovery Offer (PADO) packet to the client computer from the BAS using the at least one processor;

sending a PPPoE Active Discovery Request (PADR) packet to the BAS from the client computer using the at least one processor;

responding to the PADR packet by sending a PPPoE Active Discovery Confirmation (PADS) packet to the client computer from the BAS so as to create a new connection between the client computer and the BAS using the at least one processor; and discarding the PADT packet sent from the client computer if the client computer is not allowed to perform the prompt redial, subsequently redialing after a predetermined period of time using the at least one processor.

2. The method according to claim 1, wherein the identity data is stored in a payload field of the PADT packet.

3. The method according to claim 2, wherein the identity data comprises information for identifying whether the user of the client computer is an advanced user or an ordinary user.

4. The method according to claim 3, wherein determining if the client computer is allowed to perform a prompt redial comprises: determining the client computer is allowed to perform the prompt redial if the user is the advanced user, and determining the client computer is not allowed to perform the prompt redial if the user is the ordinary user.

* * * * *